United States Patent Office 3,428,411
Patented Feb. 18, 1969

3,428,411
COLORING OF AROMATIC POLYESTER FIBERS WITH ANTHRAQUINONE DYESTUFFS
Guido R. Genta, Dunnstown, Lock Haven, Pa., assignor to American Aniline Products, Inc., a corporation of Delaware
No Drawing. Continuation-in-part of application Ser. No. 397,611, Oct. 18, 1964. This application Jan. 10, 1967, Ser. No. 608,270
U.S. Cl. 8—39   3 Claims
Int. Cl. D06p 1/20

ABSTRACT OF THE DISCLOSURE

Aromatic polyester fibers, in particular polyethylene terephthalate fibers, are dyed with 1-amino-2-tetrahydrofurfuryloxy - 4-arylsulfonamidoanthraquinones to provide colored fibers having red to yellowish-red shades which are substantive, light fast, and sublimation resistant.

---

This application is a continuation-in-part of my copending application Ser. No. 397,611, filed Oct. 18, 1964 now abandoned.

For years there has been a considerable effort expended in the dyestuff industry to find acceptable colors for the aromatic polyester fibers. These fibers, which have outstanding utility as textile materials, are made, for example, by heating a glycol of the formula: $HO(CH_2)nOH$, wherein $n$ is an integer greater than one but not exceeding 10, with isophthalic or terephthalic acid or with an ester-forming derviative thereof; for example, an aliphatic or aryl ester or half ester, an acid halide, or an amine salt, under conditions at which polycondensation is effected. Of these polyesters, polyethylene terephthalate, or "Dacron," has made a remarkable impact on the textile industry.

Generally, the aromatic polyester fibers have a poor affinity for dyestuffs and they do not readily absorb colorants from aqueous dispersions. As a result, considerable difficulty has been encountered in finding dyestuffs for e.g. polyethylene terephthalate which are acceptable in all of the important physical properties of substantivity, light fastness, and resistance to sublimation. The standard of performance required with respect to these physical properties has become increasingly critical because of the demands of the the textile mills.

I have discovered certain new anthraquinone dyestuffs which give outstanding overall performance when dyed on aromatic polyester fibers, particularly on polyethylene terephthalate. The affinity for the fiber, light fastness, and resistance to sublimation of my new anthraquinone compounds is, by current standards, quite remarkable when considered in the light of the performance of certain structurally similar materials. Straley et al. in U.S. 3,087,773 describe the use on polyester fibers of a series of 1-amino-4-arylsulfonamidoanthraquinones having lower alkoxy or lower alkoxyalkoxy substituents in the 2-position. These colors have fair to good affinity for polyester fibers, but only poor to fair sublimation properties according to current standards. In U.S. 3,072,683 Straley et al. describe dyeing polyester fibers with 1-amino-4-alkylsulfonamidoanthraquinones having lower alkoxyalkoxy or tetrahydrofurfuryloxy substituents in the 2-position. These colors have good affinity for polyester fibers, but only fair sublimation characteristics at higher temperatures.

The substantivity and tinctorial strength of my new dyestuffs are quite remarkable in comparison with most known red anthraquinone dyes. Furthermore, my new dyestuffs provide a color of yellowish-redness, a shade which is preferred over the bluish cast of most known red anthraquinone dyes.

In accordance with the invention, aromatic polyester fibers are dyed with anthraquinone dyestuffs of the formula:

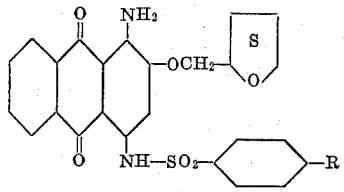

wherein R is hydrogen or methyl.

The dyestuffs are made using as one of the reactants a 1-amino-4-benzenesulfonamido-(or 4-toluenesulfonamido) anthraquinone containing a halo, sulfo, or phenoxy group in the 2-position. Thus, useful anthraquinone intermediates include 1 - amino-2-chloro-4-p-toluenesulfonamidoanthraquinone, 1 - amino - 2 - bromo - 4-p-toluenesulfonamidoanthraquinone, 1 - amino-2-chloro-4-benzenesulfonamidoanthraquinone, 1 - amino-2-sulfo-4-p-toluenesulfonamidoanthraquinone, 1 - amino - 2 - phenoxy - 4 - benezenesulfonamidoanthraquinone, and the like. The useful 2-haloanthraquinone intermediates are conveniently made by condensing a 1-amino-2-halo-4-bromoanthraquinone with para - toluenesulfonamide or benzenesulfonamide in an inert solvent in the presence of sodium acetate and copper acetate.

The anthraquinone intermediate is reacted with an alkali metal salt of tetrahydrofurfuryl alcohol.

Conveniently, the reaction is effected by mixing the anthraquinone intermediate with a substantial excess of the tetrahydrofurfuryl alcohol, which is converted to its alkali metal salt before reaction takes place. This is accomplished by heating the tetrahydrofurfuryl alcohol in the presence of sodium or potassium hydroxide or carbonate in an amount sufficient to convert the hydroxymethyl group to the sodium or potassium salt thereof. The mixture of anthraquinone intermediate and alcohol is heated to at least 125° C., preferably to 130–140° C., and held at that temperature until reaction is complete, which generally requires 10–20 hours.

After the reaction is complete, an alcoholic mineral acid or an organic acid, such as glacial acetic acid, previously diluted, is added dropwise to the mass. The product dye is recovered by filtration and it is washed with cold water until it is free of acid, inorganic materials, and excess solvent.

The above procedure can be modified by running the reaction in an inert organic solvent rather than an excess of the tetrahydrofurfuryl alcohol. In this case at least one mole of alcohol should be used, based on the weight of the anthraquinone intermediate. Suitable solvents include dioxane, ethylene glycol monomethyl ether, ethylene glycol monoethyl ether, diethylene glycol monoethyl ether, dimethylsulfoxide, dimethylformamide, and the like.

The dyestuff may be standardized either as a disperse paste or a disperse powder by any of the basic standardizing techniques that have been known to the art for many years; i.e., by the use of appropriate amounts of common dispersants and standardizing agents, usually together with small amounts of anionic wetting agent to assist in dispersion.

Standardized pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The dispersed paste is cut or standardized to a standard strength with a diluent, such as sodium sulfate or dextrin. As noted above, any conventional wetting agent, e.g., sodium cetyl sulfonate, may be added to wet out the product. The final color content of the finished paste averages from 10-40 percent by weight (pure color) active dyestuff base.

Standardized dispersed powders are prepared by wet milling color in the presence of a dispersant, such as those mentioned hereabove, in equipment, such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to wet out the product. Dispersed powders are usually cut or standardized to 25-60 percent by weight color content (pure color).

The dyestuff, when added to water with or without auxiliary agents, forms a near colloidal aqueous dispersion from which the aromatic polyester fiber or textile material is dyed in the conventional manner at 50-100° C. to give a colored fiber containing about 0.01-2 percent by weight dyestuff.

Alternatively, dyeing may be accomplished without a carrier at temperatures of 100-150° C. under pressure. Printing and padding are carried out in the presence of suitable thickening agents followed by fixation at high temperatures with or without steam.

The dyestuffs can also be applied to the aromatic polyester fiber by thermofixation methods, such as the "Thermosol" process. This process, which involves the use of controlled heat, such as hot air or heated contact rolls, is conveniently used for dyeing polyester and polyamide fibers and mixtures containing these fibers. Temperatures of 180-220° C. (ca. 360-425° F.) are used for 30 to 90 seconds. If the fabric contains cotton or viscose rayon, apart from synthetic fibers, there is no danger of damaging cellulosic portions, but if wool is present, the temperature must be kept within 180-200° C. and the time must be reduced to 30 seconds.

In order to evaluate the effectiveness of a particular dyestuff for a given type of fiber, the dyed fiber is examined for substantivity of the color, light fastness of the color, and resistance of the color to sublimation.

Substantivity is a measure of affinity of the dyestuff for a particular fiber. In the trade, substantivity is evaluated in terms of "pile on"; in other words, the degree to which the depth of the dyeing is proportional to the amount of dye applied.

The light fastness of a dyed fiber is conveniently measured by accelerated laboratory testing methods involving exposure of the colored fabric to an artificial source of sunlight. The recommended testing procedure is Standard Test Method 16A-1957, which is described on page 107 of the Technical Manual of the American Association of Textile Chemists and Colorists, 35 (1959). For colored aromatic polyester fibers, such as polyethylene terephthalate, an exposure time of at least 40 hours with little or no change in the color of the sample being tested shows that the light fastness of the sample meets the required goal according to current standards. Certain dyestuffs which are sold commercially for coloring polyethylene terephthalate show, when applied thereto, a break in color after only 20 hours' exposure. One of the outstanding features of the dyestuffs used in the invention is their stability to light even at an exposure time of 40 hours and higher.

Sublimation characteristics are determined generally according to Tentative Test Method 5-1957, which appears on page 100 of the Technical Manual of the American Association of Textile Chemists and Colorists, 35 (1959). That method, the so-called "dry-sublimation" technique, involves placing the dyed fabric between two undyed swatches and heating at a predetermined temperature for a short period of time. Slight or no transference of color to the undyed swatches at temperatures of 375° F. and 400° F. indicates excellent resistance to sublimation. As I have noted, resistance to sublimation is one of the outstanding properties possessed by my dyestuffs when they are applied to an aromatic polyester fiber.

My invention is further illustrated by the following examples:

EXAMPLE I

To a 500 ml. flask there were charged 250 g. amyl alcohol (B.P. 138° C.), 25 g. p-toluenesulfonamide, 35 g. 1-amino-2-chloro-4-bromoanthraquinone, 12 g. anhydrous sodium acetate, and 1 g. copper aceate. The mixture was refluxed for a period of six hours at 122-125° C. After cooling to 30° C., the reaction mass was filtered and the cake was washed with 50 g. of ethyl alcohol and then with water. It was then dried at 75-80° C. There was thus obtained 1-amino-2-chloro-4-p-toluenesulfonamidoanthraquinone in a yield corresponding to 85 percent of theory.

To a 500 ml. flask there was then charged 200 g. tetrahydrofurfuryl alcohol, 36 g. of the 1-amino-2-chloro-4-p-toluenesulfonamidoanthraquinone, 38 g. phenol, and 33 g. potassium carbonate. The mixture was heated to 130-135° C. Water formed during the reaction was distilled off and the reaction temperature was maintained for a period of 16 hours. The mass was then cooled to 60° C. and a solution containing 300 g. ethyl alcohol and 50 g. glacial acetic acid was added thereto. The product thus obtained was isolated by filtration at 30° C., washed wtih cold water, and dried. There was thus obtained 30 g. of pure red dye corresponding to a yield of 76 percent of theory.

The dye was ball milled for 24 hours with 8 g. of sodium lignin sulfonate, available commercially as "Marasperse N," 8 g. wetting agent, and 154 cc. of water. There was thus obtained 200 g. of a 15 percent red paste.

EXAMPLE II

The dyestuff of Example I was evaluated as a color for polyethylene terephthalate as follows:

A colloidal solution of the disperse color of Example I was made by dissolving one gram of standardized disperse color in a medium containing 25 ml. of 10 percent "Igepon T" (described by its manufacturer as

and 475 ml. water at 90-95° C.

The dye bath was prepared as follows: To a stainless steel vessel was charged 190 ml. of 70° C. water. There was then added 5 ml. of a 1 percent "Igepon T" solution and 5 ml. of 10 percent strength modified self-emulsifiable solvent carrier. To the bath there was slowly added with stirring 50 ml. of the previously prepared colloidal solution of dispersed color. Several 5 gram skeins of polyethylene terephthalate were added to the bath and the fibers were turned in the dye bath. The temperature of each bath was raised to 95° C. over a period of 15 minutes and held thereat for one hour. The skeins of the polyethylene terephthalate were then removed and scoured in 1 liter of 95° C. water containing soap and detergent. After ten minutes of scouring, the skeins were removed and washed with hot water. They were then oven dried at 80-90° C.

The samples of polyethylene terephthalate were visually evaluated for color value and tested for light fastness and sublimation according to the standard AATCC tests referred to hereabove. Light fastness was measured using an "Atlas Carbon Arc Fade-O-Meter-Type FDAR" according to standard Test Method 16A-1957. Observations were made at 20 hour intervals for a break caused by the fading of the color. One "Fade-O-Meter" hour represents approximately five days of exposure to sunlight. A definite break in the color before 20 hours exposure time is considered poor. A slight break at 20 hours is rated as fair, and a break between 40 and 60 hours shows that the light fastness is good for most purposes. If the sample withstands more than 60 hours exposure without a break in the color, the light fastness is considered to be excellent. The product of Example I was characterized by excellent light fastness.

Fastness to sublimation was determined generally according to Tentative Test Method 5–1957 of the AATCC. A piece of dyed polyethylene terephthalate cloth was placed between pieces of undyed polyethylene terephthalate. The cloth was then rolled up and stapled together. It was then placed in an Atlas Scorch Tester at 375° F. for one minute. A second test sample was prepared and heated at 400° F. for one minute. Observation was then made of the color which was found on the undyed polyethylene terephthalate. An excellent sublimation is one in which both undyed cloths remain completely free of color or show only slight traces of color using the 400° F. test temperature. The dyestuff of Example I had excellent sublimation properties.

EXAMPLE III

A similar red dyestuff is obtained if the procedure of Example I is repeated using 1-amino-2-chloro-4-benzenesulfonamidoanthraquinone as the 2-haloanthraquinone intermediate. Dyeings made from this product are very similar to those obtained in Example I.

I claim:
1. A dyed product consisting of aromatic polyester fiber dyed with a compound of the formula:

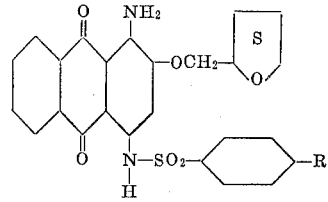

wherein R is a member selected from the group consisting of hydrogen and methyl.

2. The dyed product of claim 1 wherein the aromatic polyester fiber is polyethylene terephthalate and R is methyl.

3. The dyed product of claim 1 wherein the aromatic polyester fiber is polyethylene terephthalate and R is hydrogen.

References Cited

UNITED STATES PATENTS

| | | | |
|---|---|---|---|
| 3,072,683 | 1/1963 | Straley et al. | 260—347.2 |
| 3,087,773 | 4/1963 | Straley et al. | 8—39 |
| 3,240,551 | 3/1966 | Fitzpatrick et al. | 260—371 X |

NORMAN G. TORCHIN, *Primary Examiner.*

T. J. HERBERT, JR., *Assistant Examiner.*

U.S. Cl. X.R.

8—55; 260—347.2, 371